United States Patent
Zhou et al.

(10) Patent No.: US 11,879,447 B2
(45) Date of Patent: Jan. 23, 2024

(54) COMPOSITE STRUCTURES FOR RECIPROCATING GAS COMPRESSOR SYSTEMS

(71) Applicant: Waukesha Bearings Corporation, Waukesha, WI (US)

(72) Inventors: Jie Zhou, Pearland, TX (US); David Donald Johnson, III, Louisville, KY (US)

(73) Assignee: Waukesha Bearings Corporation, Waukesha, WI (US)

( * ) Notice: Subject to any disclaimer, the term of this patent is extended or adjusted under 35 U.S.C. 154(b) by 91 days.

(21) Appl. No.: 17/447,238

(22) Filed: Sep. 9, 2021

(65) Prior Publication Data
US 2022/0074400 A1   Mar. 10, 2022

Related U.S. Application Data (60) Provisional application No. 63/076,186, filed on Sep. 9, 2020.

(51) Int. Cl.
| | | |
|---|---|---|
| *F04B 39/04* | (2006.01) | |
| *F16J 15/56* | (2006.01) | |
| *F04B 39/00* | (2006.01) | |
| *F16J 15/20* | (2006.01) | |

(52) U.S. Cl.
CPC ........ *F04B 39/041* (2013.01); *F04B 39/0022* (2013.01); *F16J 15/20* (2013.01); *F16J 15/56* (2013.01)

(58) Field of Classification Search
CPC ..... F04B 39/041; F04B 39/0022; F16J 15/20; F16J 15/56
See application file for complete search history.

(56) References Cited

U.S. PATENT DOCUMENTS

| | | |
|---|---|---|
| 2,973,978 A | 3/1961 | Oppenheim |
| 3,542,374 A | 11/1970 | Neilson et al. |
| 3,736,007 A | 5/1973 | Heilhecker et al. |
| 3,780,418 A | 12/1973 | Hurst |
| 4,147,824 A | 4/1979 | Dettmann et al. |
| 4,602,791 A | 7/1986 | Zöllner |

(Continued)

FOREIGN PATENT DOCUMENTS

| | | |
|---|---|---|
| DE | 3833966 | 4/1990 |
| DE | 102015225823 A1 | 6/2017 |

(Continued)

OTHER PUBLICATIONS

International Search Report and Written Opinion in International Appln. No. PCT/US2021/049477, dated Apr. 5, 2022, 29 pages.

(Continued)

*Primary Examiner* — Gilbert Y Lee
(74) *Attorney, Agent, or Firm* — Fish & Richardson P.C.

(57) ABSTRACT

A packing case assembly includes a packing cup configured to be disposed along a piston rod of a reciprocating gas compressor system; and a packing ring set disposed in the packing cup, the packing ring set including multiple rings. The packing ring set is configured to be disposed circumferentially around a portion of the length of the piston rod. A backup packing ring of the packing ring set includes a first region including a polymer, and a second region including a metal.

21 Claims, 10 Drawing Sheets

(56) References Cited

U.S. PATENT DOCUMENTS

| | | | |
|---|---|---|---|
| 4,900,629 A | 2/1990 | Pitolaj | |
| 4,961,891 A | 10/1990 | Pitolaj | |
| 5,032,335 A | 7/1991 | Wilson | |
| 5,399,307 A | 3/1995 | Dalton et al. | |
| 5,551,707 A | 9/1996 | Pauley et al. | |
| 5,698,300 A | 12/1997 | Wimmer et al. | |
| 5,867,900 A | 2/1999 | Larson et al. | |
| 5,903,815 A | 5/1999 | Scott | |
| 6,085,788 A | 7/2000 | Larson et al. | |
| 6,286,837 B1 * | 9/2001 | Humphrey | F16J 15/26 277/435 |
| 7,581,734 B1 | 9/2009 | McLeod | |
| 8,231,376 B2 | 7/2012 | Iwakiri et al. | |
| 8,647,561 B2 | 2/2014 | Fang et al. | |
| 9,511,523 B2 | 12/2016 | Wojcicki | |
| 9,782,956 B2 | 10/2017 | Liao et al. | |
| 9,803,690 B2 | 10/2017 | Ziegler et al. | |
| 9,981,284 B2 | 5/2018 | Guo et al. | |
| 10,113,588 B2 | 10/2018 | Schmitjes | |
| 10,359,116 B2 | 7/2019 | Feistel | |
| 2003/0034582 A1 | 2/2003 | Dittrich | |
| 2004/0037984 A1 | 2/2004 | Ueda et al. | |
| 2004/0141871 A1 | 7/2004 | Kondo et al. | |
| 2004/0227301 A1 * | 11/2004 | Wood | F16J 15/26 277/434 |
| 2007/0290402 A1 | 12/2007 | Edwards | |
| 2008/0012236 A1 * | 1/2008 | Reilly | F16J 15/26 277/318 |
| 2008/0260565 A1 | 10/2008 | Okano et al. | |
| 2013/0259968 A1 | 10/2013 | Wojcicki | |
| 2013/0337218 A1 | 12/2013 | Liu et al. | |
| 2015/0070124 A1 | 3/2015 | Kapoor et al. | |
| 2015/0137404 A1 | 5/2015 | Tuchinskiy | |
| 2015/0376864 A1 | 12/2015 | Choi et al. | |
| 2016/0327090 A1 | 11/2016 | Shibamiya et al. | |
| 2016/0345692 A1 | 12/2016 | Baker et al. | |
| 2022/0074450 A1 | 3/2022 | Bekisli et al. | |

FOREIGN PATENT DOCUMENTS

| | | |
|---|---|---|
| JP | H1163226 A | 3/1999 |
| JP | 2011112202 A | 6/2011 |
| JP | 5224231 A | 7/2013 |
| WO | WO 198001832 | 9/1980 |
| WO | WO2013177403 A1 | 11/2013 |
| WO | WO2014175972 A2 | 10/2014 |

OTHER PUBLICATIONS

Invitation to Pay Additional Fees in International Appln. No. PCT/US2021/049477, dated Dec. 22, 2021, 17 pages.

Wikipedia.org [online], "Perfluoroalkoxy alkane," Feb. 2014, retrieved on Apr. 8, 2022, retrieved from URL <https://en.wikipedia.org/wiki/Perfluoroalkoxy_alkane>, 3 pages.

Wikipedia.org [online], "Polyether ether ketone," Jun. 2003, retrieved on Apr. 8, 2022, retrieved from URL <https://en.wikipedia.org/wiki/Polyether_ether_ketone>, 4 pages.

Wikipedia.org [online], "Ultra-high-molecular-weight polyethylene," Jun. 2005, retrieved on Apr. 8, 2022, retrieved from URL <https://en.wikipedia.org/wiki/Ultra-high-molecular-weight_polyethylene>, 9 pages.

International Search Report and Written Opinion in International Appln. No. PCT/US2021/049715, dated Dec. 13, 2021, 15 pages.

* cited by examiner

COMPOSITE STRUCTURES FOR RECIPROCATING GAS COMPRESSOR SYSTEMS

CROSS-REFERENCE TO RELATED APPLICATION

This application claims priority under 35 U.S.C. § 119 to U.S. Application Ser. No. 63/076,186, filed on Sep. 9, 2020, and entitled "Composite Structures for Reciprocating Gas Compressor Systems," the entire contents of which is incorporated by reference herein.

TECHNICAL FIELD

The present disclosure generally relates to composite structures, such as composite backup packing rings, e.g., for use in a reciprocating gas compressor system.

BACKGROUND

Mechanical components such as wear rings, rod rings, piston rings, oil wiper rings, wear bands, back-up packing rings, pressure and intermedia packing rings, bearings, or dynamic seal rings are elements of mechanical systems, such as reciprocating gas compressors. The mechanical components provide support to the mechanical system, such as by managing heat, aiding in rotation, enhancing the durability of the system, reducing lubrication consumption, narrowing gas flow, and enabling other parts to carry out their task efficiently.

SUMMARY

This specification describes composite structures, such as composite backup packing rings. The composite backup packing rings described here can be used as part of a mechanical system, such as in a packing case assembly in a reciprocating gas compressor. The composite backup packing ring includes two or more regions of differing compositions and properties. In some examples, the composite backup packing ring includes an interlayer region or a pin defining an additional phase, e.g., between the regions. Properties such as strength, stiffness, wear resistance, coefficient of friction, material compatibility and conformability, elasticity, creep resistance, or thermal conductivity can be controlled for each region, e.g., by incorporating metal or polymer material into each region that imparts the desired properties to the region. For instance, in a composite backup packing ring, the region of the ring that is exposed to wear during operation of the mechanical system can be formed of a composition that provides improved wear resistance, while other regions of the ring can provide thermal conductivity, mechanical stiffness or strength, or other properties to the backup packing ring.

In an aspect, a packing case assembly includes a packing cup configured to be disposed along a piston rod of a reciprocating gas compressor system; and a packing ring set disposed in the packing cup, the packing ring set including multiple rings. The packing ring set is configured to be disposed circumferentially around a portion of the length of the piston rod. A backup packing ring of the packing ring set includes a first region including a polymer, and a second region including a metal.

Embodiments can include one or any combination of two or more of the following features.

An inner surface of the backup packing ring is configured to face the portion of the length of the piston rod. The first region including the polymer extends along at least a portion of the inner surface of the backup packing ring. The first region including the polymer extends along the entire inner surface of the backup packing ring. The first region including the polymer extends along a first portion of the inner surface of the backup packing ring and the second region including the metal extends along a second portion of the inner surface of the backup ring.

The first region including the polymer extends along a first side surface of the backup packing ring, wherein the first side surface is perpendicular to an inner surface of the backup packing ring and is configured to face toward a high-pressure end of the piston rod. The first region including the polymer extends along the entire first side surface of the backup packing ring. The first region including the polymer extends along a second side surface of the backup packing ring, wherein the second side surface is perpendicular to the inner surface of the backup packing ring and is configured to face toward a low-pressure end of the piston rod. The first region including the polymer extends along the entire second side surface of the backup packing ring.

The first region including the polymer contacts the second region including the metal.

The backup packing ring includes an interlayer region disposed between the first region including the polymer and the second region including the metal.

The backup packing ring includes a pin.

A thermal conductivity of the metal of the second region is higher than a thermal conductivity of the polymer of the first region. The thermal conductivity of the metal of the second region is between 0.5 W/(m·K) and 450 W/(m·K).

A strength of the metal of the second region is higher than a strength of the polymer of the first region. The tensile strength of the metal of the second region is between 50 MPa and 3000 MPa at a room temperature. The tensile strength of the polymer of the first region is between 10 MPa and 500 MPa at a room temperature.

A coefficient of friction between the piston rod and the polymer of the first region is less than a coefficient of friction between the piston rod and the metal of the second region.

A wear resistance of the polymer of the first region is greater than a wear resistance of the metal of the second region.

The metal includes one or more of cast iron, bronze, aluminum, an aluminum alloy, or steel.

The polymer includes one or more of polyether ether ketone, polytetrafluoroethylene, nylon, or an aromatic thermosetting copolyester.

The first region includes one or multiple layers. One of the multiple layers includes a material that is different than the material of at least one other layer of the multiple layers.

The first region includes a metallic filler.

The first region includes a non-metallic filler.

In an aspect, a reciprocating gas compressor system includes a piston rod movable from a first end to a second end of the compressor system, and wherein a gas compressor system is defined at the second end of the compressor system. The reciprocating gas compressor system includes a packing case assembly including a packing cup disposed along the piston rod; and a packing ring set disposed in the packing cup, the packing ring set including multiple rings. The packing ring set is disposed circumferentially around a portion of the length of the piston rod. A backup packing ring of the packing ring set includes a first region including a polymer; and a second region including a metal.

In an aspect, a reciprocating machine includes a reciprocating component having an outer surface and two or more rings that receive a portion of the reciprocating component. At least one of the two or more rings includes a first region including a polymer, a second region including a metal, an inner surface that couples with the outer surface of the reciprocating component, and opposing side surfaces adjoining the inner surface. The first region including the polymer forms the inner surface and at least a portion of at least one of the side surfaces.

Embodiments can include one or any combination of two or more of the following features.

The first region including the polymer forms the inner surface and at least a portion of each of the opposing side surfaces.

At least one of the opposing side surfaces is perpendicular to the inner surface.

At least one of the seal rings is a backup packing ring.

At least one of the seal rings is a pressure breaker. The pressure breaker is the seal ring that is nearest a compression cylinder of the reciprocating machine.

At least one of the seal rings is an intermediate pressure packing ring.

At least one of the seal rings is a piston ring.

In an aspect, a seal ring includes a first region including a polymer, a second region including a metal, an inner surface that couples with the outer surface of the reciprocating component, and opposing side surfaces adjoining the inner surface.

The first region including the polymer forms the inner surface and at least a portion of at least one of the side surfaces.

In an aspect, a seal ring includes a first region including a polymer, a second region including a metal, an inner surface that couples with the outer surface of the reciprocating component, and opposing side surfaces adjoining the inner surface. The first region including the polymer forms the inner surface and at least a portion of at least one of the side surfaces.

In an aspect, a ring includes a first region including a polymer, a second region including a metal, an inner surface that couples with an outer surface of a reciprocating component, and
opposing side surfaces adjoining the inner surface. The first region including the polymer forms the inner surface and at least a portion of at least one of the side surfaces.

Embodiments can include one or any combination of two or more of the following features.

The ring is a seal ring.

The ring backs up one or more seal rings of a packing case.

The ring couples with a reciprocating component of a reciprocating compressor.

The ring is a sealing ring, a backup ring, a pressure breaker, an oil wiper, and piston band, or a rider ring.

In an aspect, an oil wiper ring includes a first region including a polymer and a second region including a metal. The oil wiper ring is disposed circumferentially around a portion of the length of a piston rod. The oil wiper ring is configured to wipe oil from the piston rod when the piston rod is moving.

The details of one or more embodiments of these systems and methods are set forth in the accompanying drawings and the description below. Other features, objects, and advantages of these systems and methods will be apparent from the description and drawings, and from the claims.

DETAILED DESCRIPTION

This specification describes composite structures, such as composite backup packing rings. The composite backup packing ring described here can be used as part of a mechanical system, such as in a packing cup assembly in a reciprocating gas compressor. The composite backup packing ring includes two or more regions of differing compositions and properties. In some examples, the composite backup packing ring includes an interlayer region or a pin defining an additional phase, e.g., between the regions. Properties such as strength, stiffness, wear resistance, coefficient of friction, material compatibility and conformability, elasticity, creep resistance, or thermal conductivity can be controlled for each region, e.g., by incorporating metal or polymer material into each region that imparts the desired properties to the region. For instance, in a composite backup packing ring, the region of the ring that is exposed to wear during operation of the mechanical system can be formed of a composition that provides improved wear resistance, while other regions of the ring can provide thermal conductivity, mechanical stiffness or strength, or other properties to the ring.

The presence of two or more regions of differing compositions and properties in the composite backup packing ring can impart various desired properties to the composite backup packing ring. For example, the presence of combined metal and polymer regions into one ring can utilize the increased strength and the high thermal conductivity of the metal to provide support for the backup packing rings (or upstream rings) and to remove heat faster from the packing rod assembly, while benefiting from the low coefficient of friction in the polymer region that enables less or no usage of lubricant.

Figure 1:
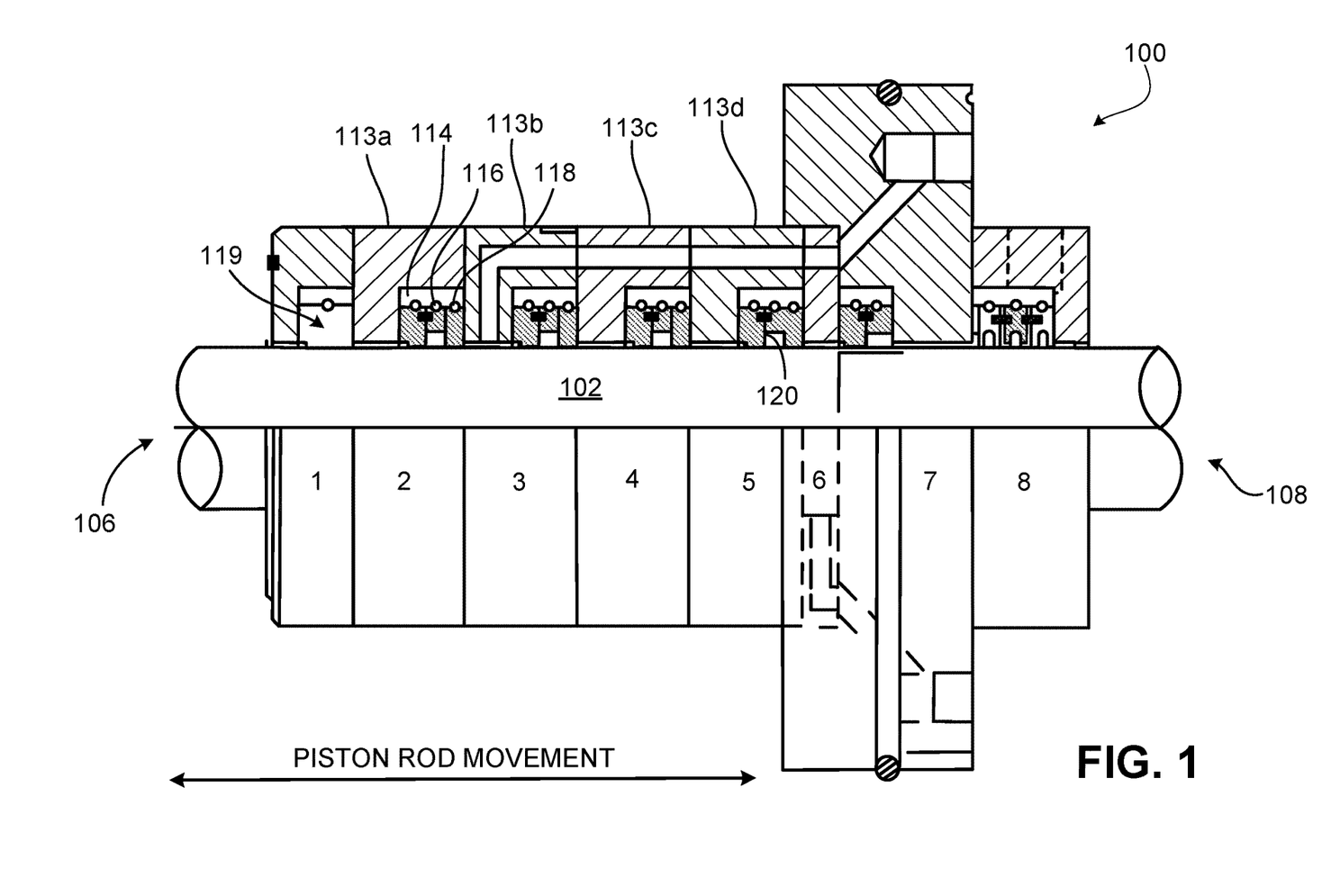
FIG. 1 is a schematic view of a packing case assembly of a reciprocating gas compressor system.

FIG. 1 is a schematic view of a packing case assembly of 100 a reciprocating gas compressor system for compression of gas, such as air, nitrogen, hydrogen, natural gas, or other types of gas. During operation of the compressor system, a piston rod 102 moves reciprocally. The piston rod 102 executes a compression stroke when in motion from a first end 106 of the assembly towards a second end of the assembly. Therefore, the first end 106 of the rod 102 is a high-pressure side of the rod and the second end 108 of the rod 102 is a low-pressure side of the rod during the compression strokes. The high-pressure and low-pressure sides of the rod is the side having the highest and lowest pressure, respectively, during the compression stroke of the piston rod.

The packing case assembly 100 includes a packing cup assembly 112 that includes one or more packing cups 113a-113d (collectively referred to as packing cups 113). The packing cups 113 prevent leakage of compressed gas along the length of the piston rod 102. The packing cups 113 that each houses a packing including a set of multiple packing rings. For instance, the packing cup 113a houses three annular packing rings 114, 116, and 118. The packing rings 114-118 are disposed circumferentially around the piston rod 102. Due to the reciprocal movement of the piston rod 102 during operation of the compressor system, the packing rings 114, 116, and 118 are exposed to friction from the piston rod, causing wear and tear on the rings. The durability of the packing rings 114, 116, and 118 contributes to the life-cycle of the packing case assembly 100.

Packing case assembly also includes pressure breaker 119. The pressure breaker 119 is the ring nearest to the compression cylinder. The pressure breaker meters the flow of gas into and out of the packing case. Pressure breaker 119 can include one or more plates or rings around the reciprocating shaft of the compressor.

Figure 2:
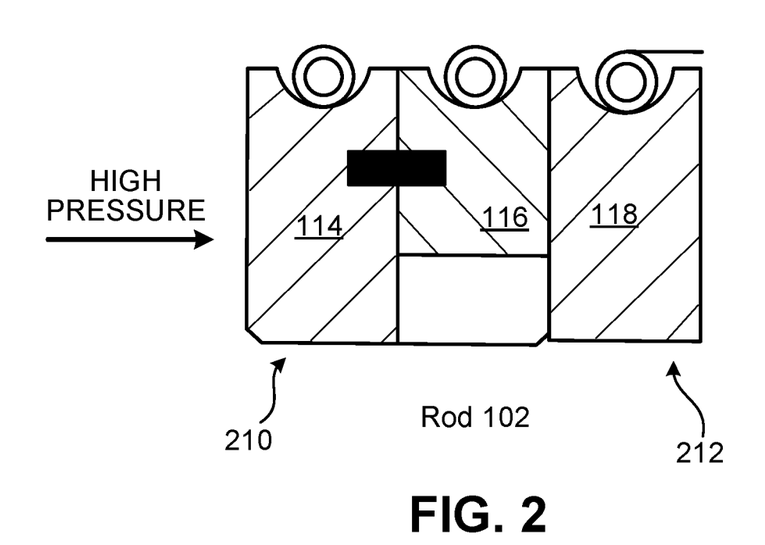
FIG. 2 is a schematic view of a section of a packing case ring set assembly.

Referring also to FIG. 2, the first packing ring 114, such as a pressure packing ring, is positioned on the high-pressure side of the packing cups 113. The second packing ring 116, such as an intermediate packing ring, is positioned adjacent the first packing ring 114, towards the second end 108 of the piston rod 102. The first and second packing rings 116 are disposed circumferentially around a first portion 210 of the length of the rod 102. The third packing ring 118, which is a backup ring, is positioned adjacent the second packing ring 116 towards the second end 108 of the rod 102, and is disposed circumferentially around a second portion 212 of the length of the rod.

During operation of the packing case assembly 100, a pressure differential arises between gas at the surface of the rod 102 and gas in a chamber 120 at an outer circumference of the packing. This pressure differential can cause the packing rings 114, 116, or 118 to compress against the piston rod 102, forming a seal. In some examples, the first packing ring 114 and the second packing ring 116 are formed of a metal, such as cast iron, steel, aluminum, an alloy of aluminum, or bronze, that enables the packing rings to withstand a high pressure differential. In some examples, the first packing ring 114 and the second packing ring is formed of a non-metallic material, such as a polymer, e.g., nylon, Teflon, or plastic.

The backup packing ring 118 is a composite material that has a first region formed of a polymeric material and a second region formed of a metallic material. The composite structure of the backup ring imparts properties of both the polymeric material and the metallic material to the backup ring. For instance, the polymeric material provides properties such as low coefficient of friction, high resistance to wear, and elasticity and conformability. The polymeric material can be disposed on a surface of the backup packing ring 118 that faces the piston rod, thereby providing durability, reducing heat generation arising from frictional contact between the ring and the piston. These properties can help prolong the life-cycle of the rings such that replacement is needed less frequently, can reduce leakage of gas, and can provide a low-friction surface that reduces or eliminates the need for lubricants. The metallic material of the second region can provide properties that may not be provided by the polymeric material of the first region. For instance, the metallic material can have a high thermal conductivity, mechanical properties such as high strength or stiffness, or both. A thermally conductive material can help dissipate heat generated within the cup. A mechanically strong or stiff material can provide a robust structure to the ring to help withstand forces that arise due to the pressure difference. The combination of multiple regions each having a distinct material with specific properties into a single, backup packing ring allows a variety of properties to be imparted to the composite ring. For instance, a composite backup packing ring can be a high-performance part with reduced lubricant consumption, with improved durability that prolongs the life-cycle of the packing ring assembly, and with high thermal conductivity that enables rapid removal of heat generated by the motion of the piston rod.

Figure 3:
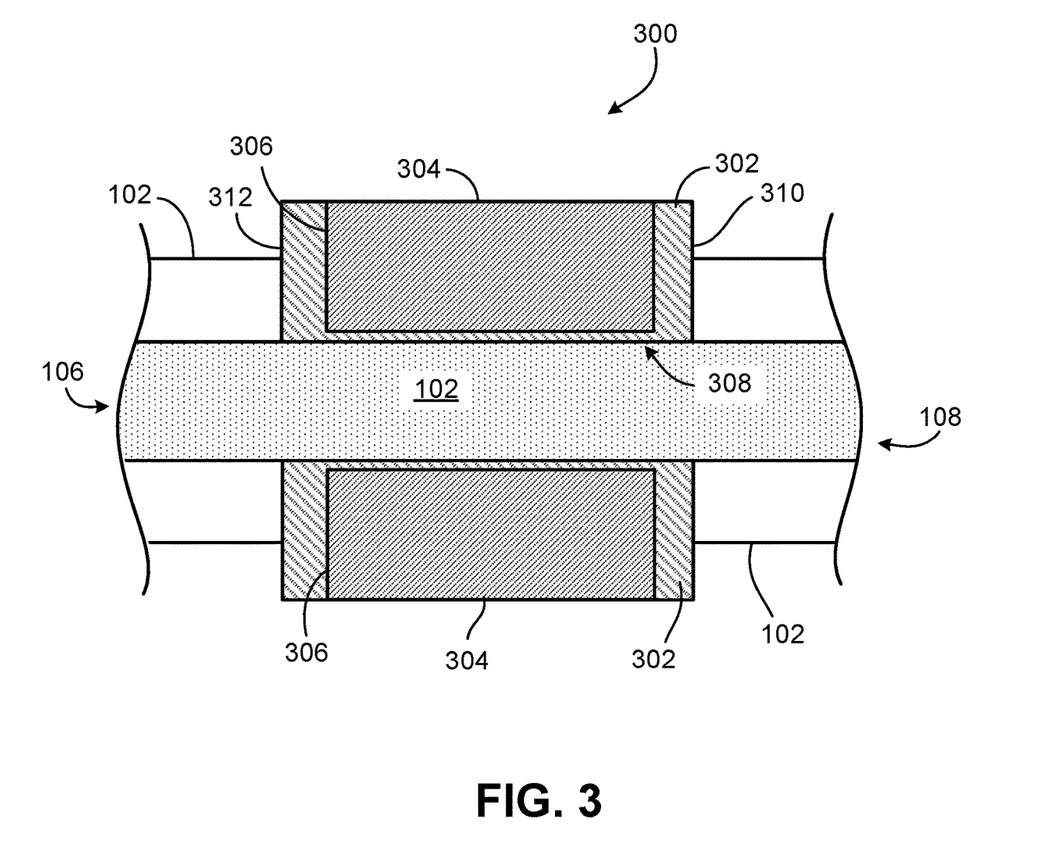
FIG. 3 is a cross-sectional view of a composite backup packing ring.

FIG. 3 is a cross-sectional view of a composite backup packing ring 300. The composite backup packing ring 300 includes a first region 302 including a polymer or metal and a second region 304 including a polymer or metal. In an example, the first region 302 is formed of a polymer and the second region 304 is formed of a metal. An inner surface 308 of the composite backup ring 300 faces the rod 102. A first side surface 312 of the backup packing ring 300 is perpendicular to the inner surface 308 and faces toward the first end 106 of the rod 102. A second side surface 310 of the backup packing ring 300 is also perpendicular to the inner surface 308 of the backup packing ring 300 and faces toward the second end 108 of the rod 102. The first region 302 extends along at least a portion of the inner surface 308 of the composite backup ring. In the example of FIG. 3, the first region 302 extends along the entire inner surface 308 of the composite backup packing ring 300. Because the material (e.g., the polymer) of the first region 302 provides lubrication and conformability, as discussed further below, the presence of the first region on the inner surface of the composite backup ring can contribute to improved wear resistance, reduced consumption of lubricants, and higher quality seals. The material (e.g., the metal) of the second region 304, meanwhile, provides properties such as mechanical strength and stiffness for structural stability and high thermal conductivity for heat management. In the example of FIG. 3, the first region 302 and the second region 304 are in direct contact with one another at an interface 306. Specific example configurations for composite backup rings are discussed further with respect to FIGS. 4-10.

As discussed above, the first and second regions 302, 304 of the composite backup ring 300 have different material properties, such as wear resistance, thermal conductivity, coefficient of friction, chemical compatibility, conformability, strength, stiffness, creep resistance, or other properties. The properties of each region depend on the material composition of the region, on the processing conditions during fabrication of the regions, or a combination thereof. By forming the composite backup packing ring 300 to include multiple regions each with different materials, the composite ring as a whole exhibits properties of both regions.

The material of the first region 302, the material of the second region 304, or both are selected to be compatible with the material of the piston rod and with the process gas that is compressed in the compressor system, such as air, nitrogen, hydrogen, natural gas, or a combination thereof. For instance, a compatible material is able to contact the piston rod without adhering to the piston rod. In some examples, such as in FIG. 3, only the material of the first region 302 is disposed on the inner surface 308 of the ring, and thus only the material of the first region contacts the piston rod. Nevertheless, the material of the second region 304 also can be selected to be compatible with the material of the piston such that, e.g., in case the material of the first region degrades or erodes, the material of the second material can work in context of a reciprocating piston rod without, e.g., welding between the piston rod and the material of the second region occurring during piston motion.

In a specific example, the first region includes one or more polymer materials such as polyether ether ketone, polytetrafluoroethylene, or aromatic thermosetting copolyester. The second region includes one or more metal materials such as cast iron, bronze, aluminum, an alloy of aluminum, steel, or alloy. The material of each of the regions 302, 304 can be chosen to impart desired properties to the respective regions, e.g., to impart wear resistance, thermal conductivity, stiffness, mechanical strength, low coefficient of friction, conformability, creep resistance or another property, or a combination thereof.

In some examples, the material of the first region 302 has sufficient strength e.g., at an elevated temperature, to help ensure that the first region 302 maintains its structural integrity at high temperature or at other loading conditions. In some examples, the coefficient of friction between the material of the first region 302 and the piston rod is low, e.g., lower than the coefficient of friction between the material of the second region 304 and the piston rod. This results in low friction between the composite backup ring and the piston rod, which can extend the lifetime of the composite backup ring, reduce the need for lubricants, or both.

In some examples, the material of the first region 302 has sufficient elasticity and conformability to provide a good seal against rigid surfaces (e.g., piston rod or packing cup). For instance, the tensile strength of the material of the second region 304 is greater than that of the material of the first region 302, such that the second region 304 provides a robust physical structure that enables the composite backup ring to withstand forces due to pressure differences arising from operation of the compressor system 100. In an example, the tensile strength of the material of the second region 304 is between 50 MPa and 3000 MPa at room temperature, e.g., between 100 MPa and 700 MPa, for instance, 50 MP, 100 MPa, 200 MPa, 500 MPa, 1000 MPa, 1500 MPa, 2000 MPa, 2500 MPa, or 3000 MPa. The tensile strength of the material of the first region 302 is less than that of the material second region, such as half or less than half of the tensile strength of the material of the second region, e.g., one-third, one-quarter, one-fifth, or one-tenth the tensile strength of the material of the second region. The tensile strength of the material of the first region 302 is between 10 MPa and 500 MPa at room temperature, e.g., between 10 MPa and 400 MPa, for instance, 10 MPa, 50 MPa, 100 MPa, 150 MPa, 200 MPa, 250 MPa, 300 MPa, 350 MPa, 400 MPa, 450 MPa, or 500 MPa.

In some examples, the polymer material of the first region 302 has a greater wear resistance than the metal material of the second region 304. The wear surface of a component (e.g., the backup packing ring) is a surface that is exposed to wear, e.g., caused by friction resulting from motion of elements such as rods or pistons. In the example of a composite backup ring, the wear surface is typically the inner surface (i.e., surface 308) of the ring. In some conditions, the side surface of the ring can also be a wear surface. Wear resistance is the ability of a material to withstand exposure to wear without becoming damaged. In the configuration of the composite backup packing ring 300, with the first region extending along at least a portion of the inner surface of the ring, the first region 302 having a high wear resistance than the second region 304 can enhance the wear resistance of the ring as a whole.

In some examples, the material of the second region 304 has greater thermal conductivity than the material of the first region 302. In an example, the thermal conductivity of the second region 304 is between 0.5 W/(m·K) and 450 W/(m·K), e.g., between 0.5 W/(m·K) and 55 W/(m·K), for instance, 10 W/(m·K), 100 W/(m·K), 250 W/(m·K), or 450 W/(m·K). The thermal conductivity of the material of the first region 302 is less than 10% that of the material of the second region. For instance, the thermal conductivity of the material of the second region is between 0.01 W/(m·K) to 40 W/(m·K), e.g., between 0.20 W(m·K) and 1.0 W(m·K), for instance, 0.20 W/(m·K), 0.40 W/(m·K), 0.60 W/(m·K), 0.80 W/(m·K), or 1.0 W/(m·K). The high thermal conductivity of the material of the second region 304 allows efficient management of heat in the packing rod assembly.

In some examples, the first region 302 includes multiple layers of material, such as layers of the same material or layers of different materials.

In some examples, the first region 302 is formed of a polymer that includes a filler, such as a metallic filler, a non-metallic filler, or both. The filler can be a lubricity additive that enhances the wear resistance of the first region, reduces the coefficient of friction of the first region, or controls the coefficient of friction of the first region within a certain range. The filler can be a structure additive that controls the strength, thermal stability, or both of the first region at various temperature conditions. The filler can be a thermal additive that controls the thermal conductivity, the coefficient of thermal expansion, or both of the first region. A non-metallic filler can include glass, carbon, graphite, or other non-metallic materials, e.g., in fiber, powder, or nanoparticle form. A metallic filler can include copper, silver, steel, or other metallic materials, e.g., in powder, nanoparticle, or fiber form.

FIGS. 4-10 are schematic views of example structures for a composite backup packing ring. The composite backup packing ring in any of the FIGS. 4-10 can be used with a mechanical system, such as the reciprocating gas compressor packing case system 100 shown in FIG. 1. In general, the composite backup rings described here can have the material of the first region (e.g., a polymer) extend along an entirety of the inner surface of the ring such that only the material of the first region is exposed to the motion of the piston rod, or can have material of both regions (e.g., both polymer and metal) along the inner surface. The composite backup rings can have one or both side surfaces entirely covered with the material of the first region, or can have material of both regions (e.g., both polymer and metal) on one or both of the side surfaces. The composite backup rings can be cut or uncut rings. A cut ring is a ring that is single round piece formed of multiple segments, such as three segments. The composite backup rings can have direct contact between the metal and the polymer, or can have an interlayer between the metal and the polymer to promote adhesion.

Figure 4:
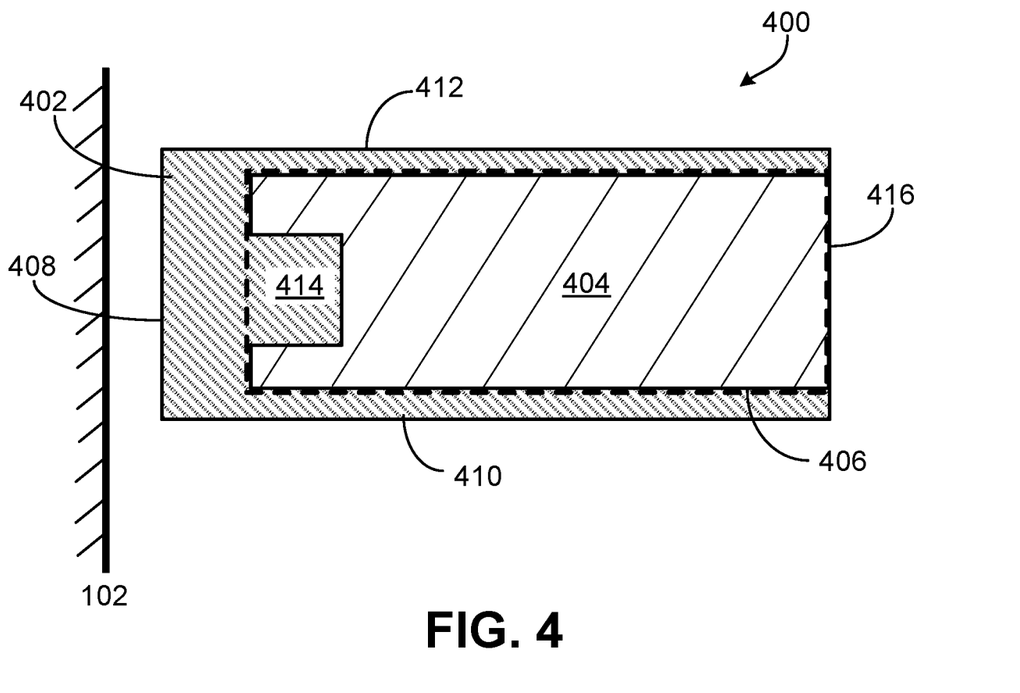
FIGS. 4-10 are schematic views of example composite backup packing rings.

FIG. 4 shows an example composite backup packing ring 400 that includes a first region 402 including a polymer and a second region 404 including a metal. The first region 402 contacts the second region 404 at an interface 406. The first region 402 extends along the entire inner surface 408 of the ring 400 such that the polymeric material is exposed to the motion of the piston rod 102 of the compressor system (denoted as a line in each of FIGS. 4-10). The first region 402 also extends along the entirety of both side surfaces 410, 412 of the ring 400. The first region 402 includes a protrusion 414 that extends partially into a rectangle 416 defined by the second region 404.

Figure 5:
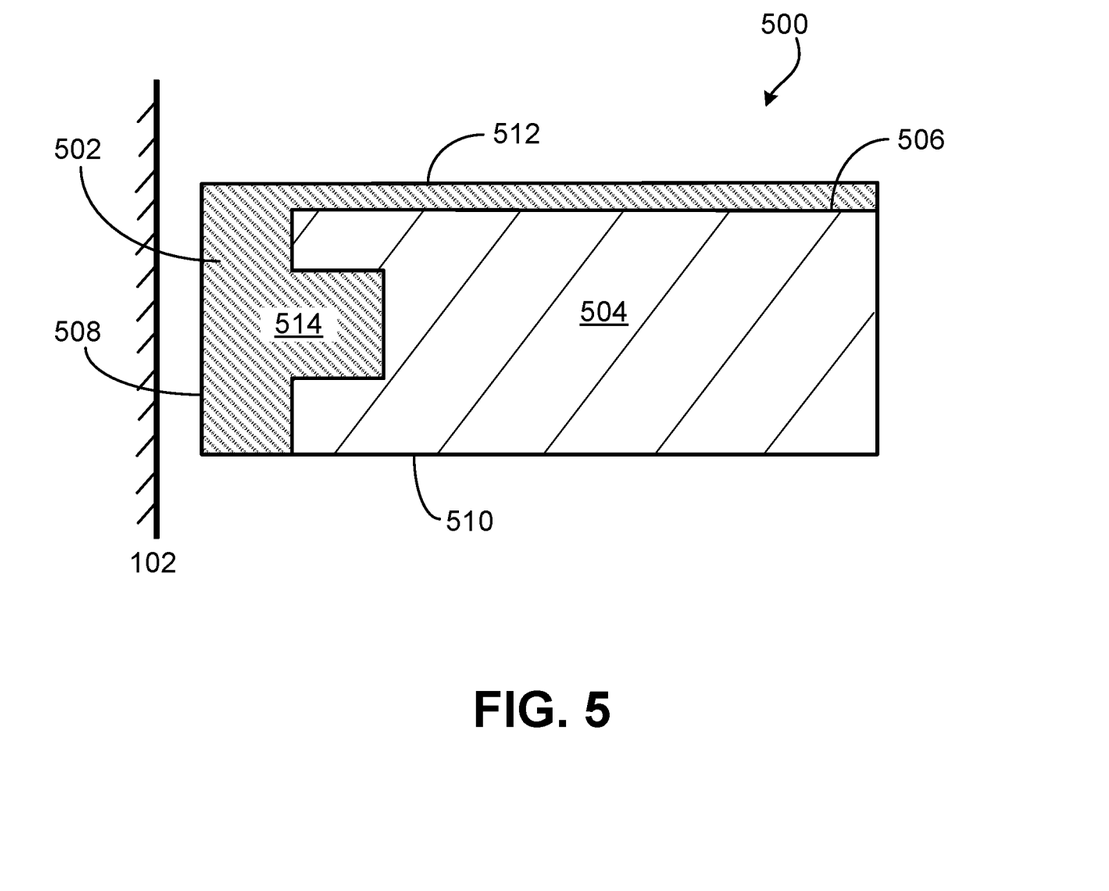

FIG. 5 shows a composite backup packing ring 500 that includes a first region 502 including a polymer material and a second region 504 including a metal material. The first region 502 contacts the second region 504 at an interface 506. The first region 502 extends along the entire inner surface 508 of the ring 500 such that the polymeric material is exposed to the motion of the piston rod 102 of the compressor system. The first region 502 also extends along the entirety of the first side surface 512 of the ring 500, e.g., the side surface that faces the high pressure side of the rod of the compressor system, and along a first portion of the second side surface 510. The second region 504 extends along the remainder of the second side surface 510. The first region 502 includes a protrusion 514 that extends partially into a rectangle (not shown) defined by the second region 504.

Figure 6A:
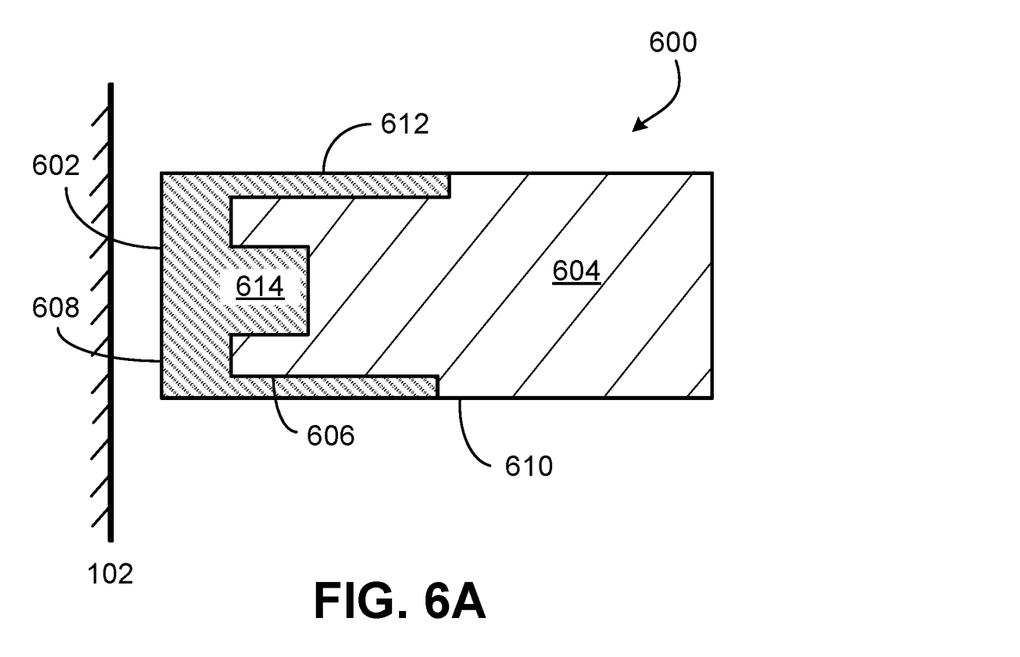

FIG. 6A shows a composite backup packing ring 600 that includes a first region 602 including a polymer material and a second region 604 including a metal material. The first region 602 contacts the second region 604 at an interface 606. The first region 602 extends along the entire inner surface 608 of the ring 600 such that the polymeric material is exposed to the motion of the piston rod 102 of the compressor system. The first region 602 also extends along a first portion of each of the first side surface 612 and the second side surface 610. The second region 604 extends along the remainder of each of the first side surface 612 and the second side surface 610. The first region 602 includes a protrusion 614 that extends partially into a rectangle (not shown) defined by the second region 604.

FIG. 6B shows a composite backup packing ring 600' with a structure similar to that of ring 600, but with an interlayer 609 disposed between the first region 602 and the second region 604 on each side of the protrusion 614. The interlayer 609 can include, e.g., porous bronze material. The function of the interlayer 609 is to enhance adhesion between the first region 602 and the second region 604.

Figure 7A:
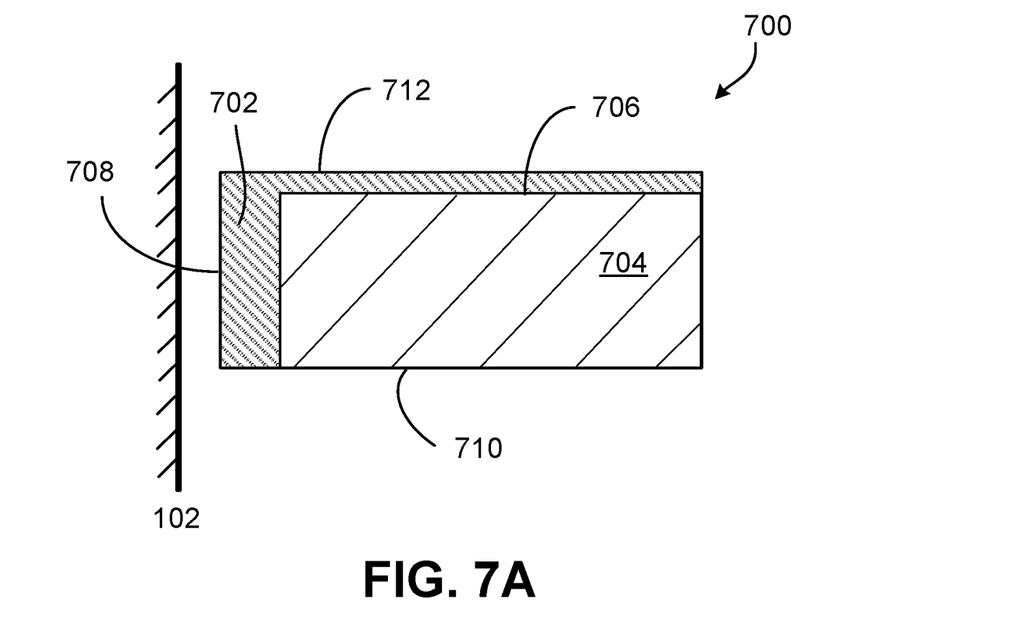

FIG. 7A shows a composite backup packing ring 700 that includes a first region 702 including a polymer material and a second region 704 including a metal material. The first region 702 contacts the second region 704 at an interface 706. The first region 702 extends along the entire inner surface 708 of the ring 700 such that the polymeric material is exposed to the motion of the piston rod 102 of the compressor system. The first region 702 also extends along the entirety of the first side surface 712, and along a first portion of the second side surface 710. The second region 704 extends along the remainder of the second side surface 710.

Figure 7B:
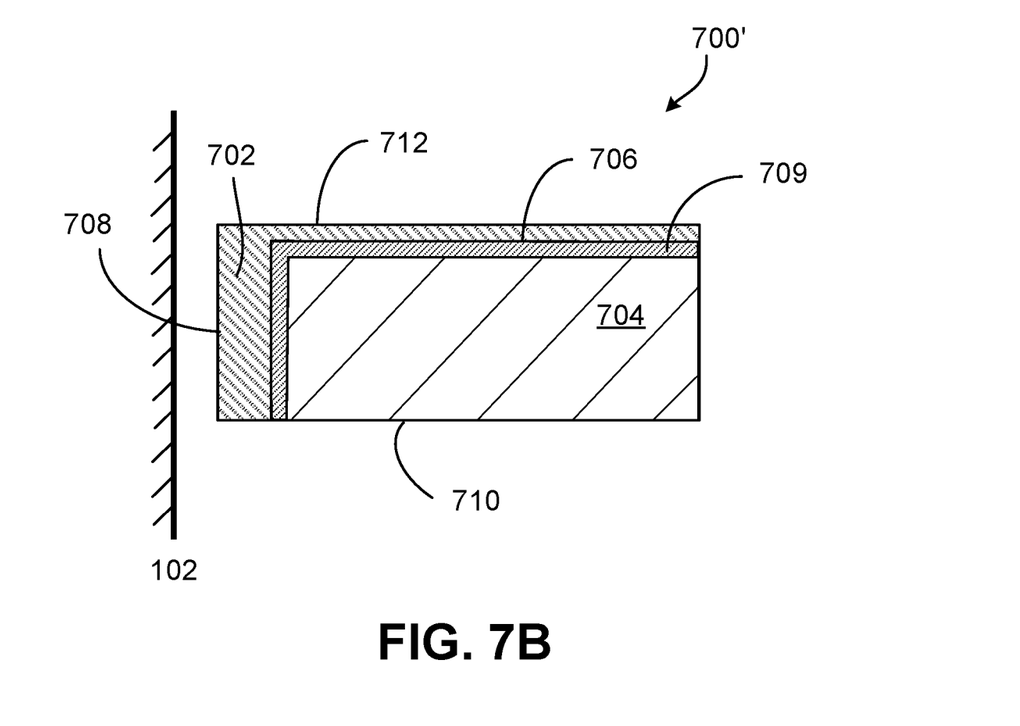

FIG. 7B shows a composite backup packing ring 700' with a structure similar to that of ring 700, but with an interlayer 709 disposed between the first region 702 and the second region 704.

Figure 8A:
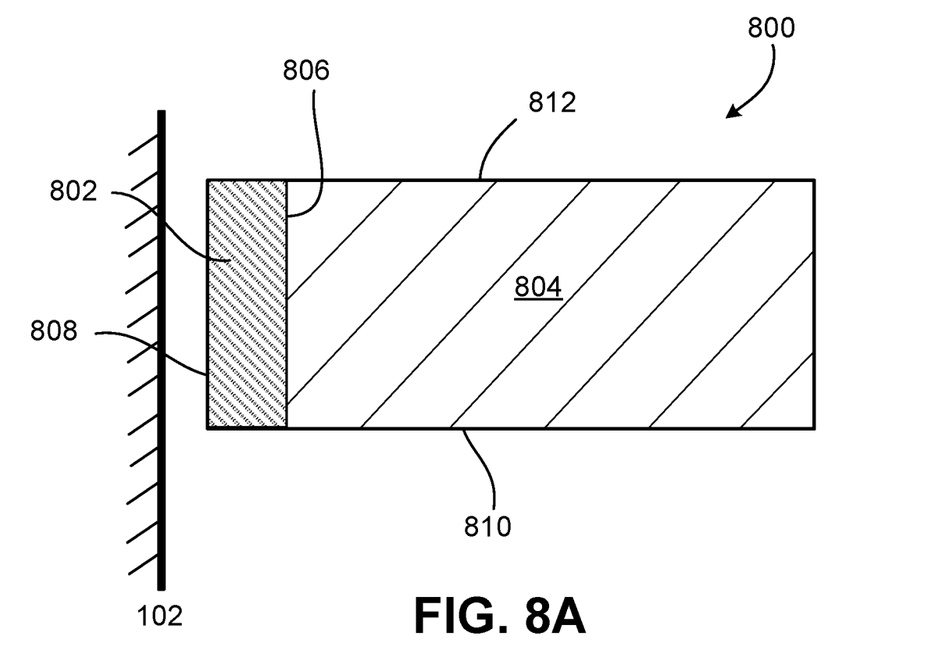

FIG. 8A shows a composite backup packing ring 800 having a layered structure, with a first region 802 including a polymer material forming a first layer and a second region 804 including a metal material forming a second layer disposed on the first layer. The layers are oriented parallel to the axis of the rod 102. The first region 802 contacts the second region 804 at an interface 806. The first region 802 extends along the entire inner surface 808 of the ring 800 such that the polymeric material is exposed to the motion of the piston rod 102 of the compressor system. The first region 802 also extends along a first portion of each of the first side surface 812 and the second side surface 810, and the second region 804 extends along the remainder of each of the first side surface 812 and the second side surface 810.

Figure 8B:
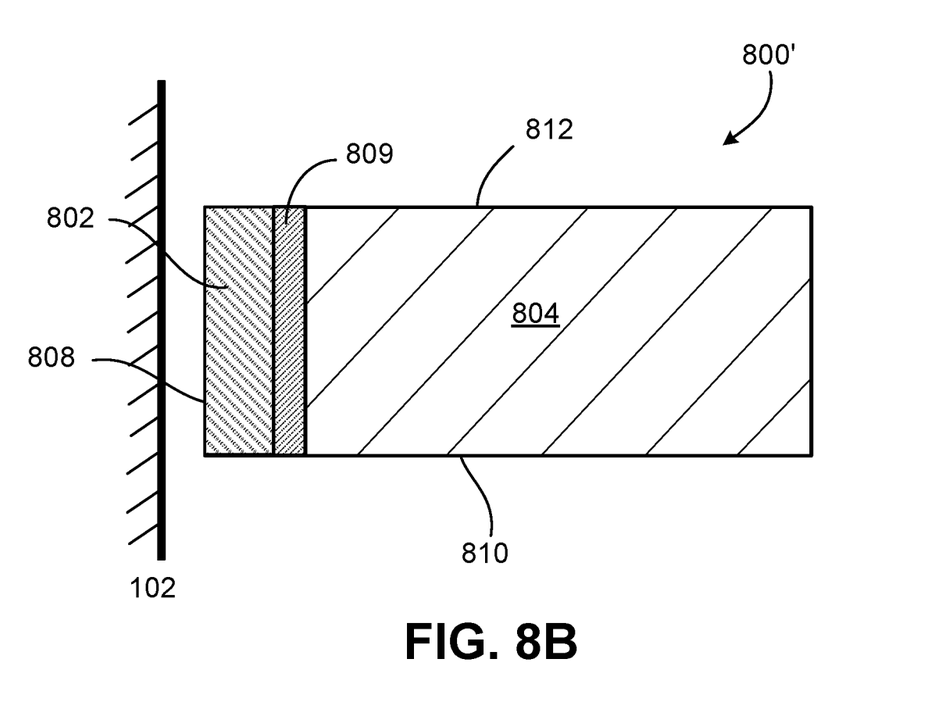

FIG. 8B shows a composite backup packing ring 800' with a structure similar to that of ring 800, but with an interlayer 809 as a third layer disposed between the first region 802 and the second region 804.

Figure 9A:
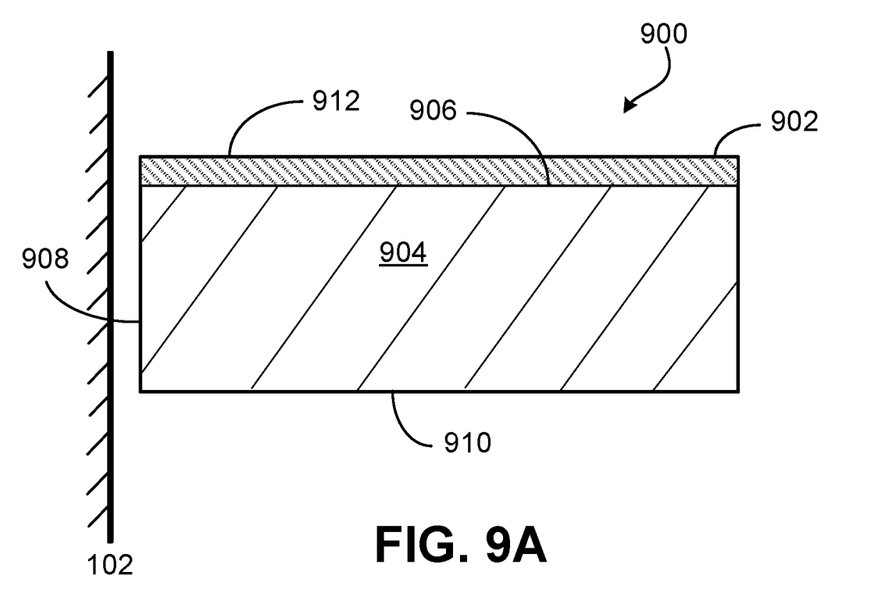

FIG. 9A shows a composite backup packing ring 900 having a layered structure, with a first region 902 including a polymer material forming a first layer and a second region 904 including a metal material forming a second layer disposed on the first layer. The layers are oriented perpendicular to the axis of the rod 102. The first region 902 contacts the second region 904 at an interface 906. The first region 902 and the second region 904 each extend along a respective portion of the inner surface 908 of the ring 900 such that both the polymeric material and the metallic material are exposed to the motion of the piston rod 102 of the compressor system. The first region 902 also extends along the entirety of the first side surface 912, and the second region 904 extends along the entirety of the second side surface 910.

Figure 9B:
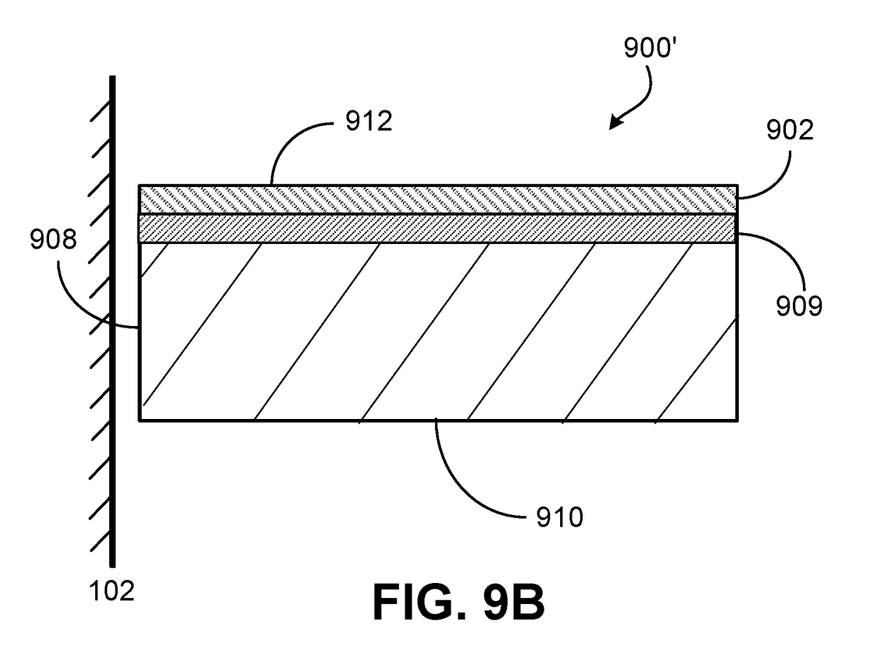

FIG. 9B shows a composite backup packing ring 900' with a structure similar to that of ring 900, but with an interlayer 909 as a third layer disposed between the first region 902 and the second region 904.

Figure 10:
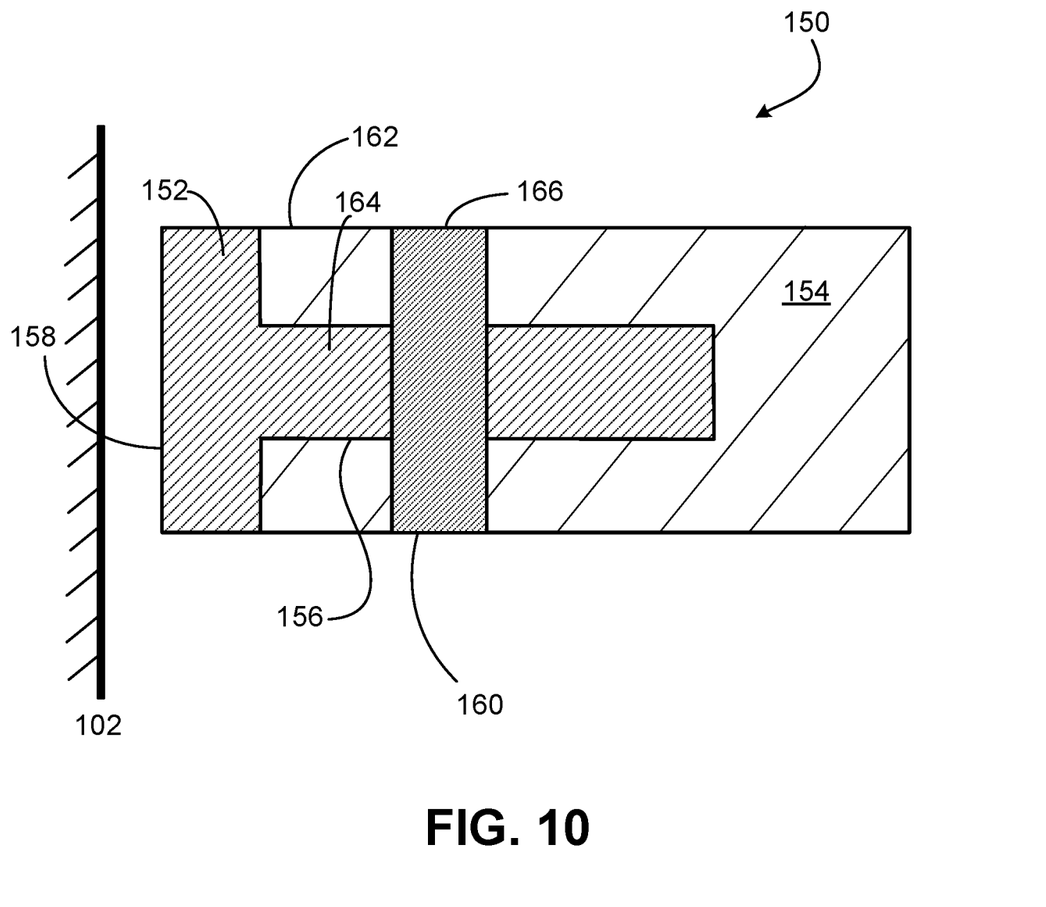

In some examples, a composite backup ring includes a pin that mechanically holds the first region and the second region together and serves as anti-rotation component. FIG. 10 shows a composite backup packing ring 150 that includes a first region 152 including a polymer material and a second region 154 including a metal material. The first region 152 contacts the second region 154 at an interface 156. The first region 152 includes a protrusion 164 that extends partially into a rectangle (not shown) defined by the second region 154. A pin 166 extends through portions of the second region 154 and through the protrusion 164 of the first region to hold the regions together. The first region 152 extends along an entire inner surface 158 of the ring 150 such that the polymeric material is exposed to the motion of the piston rod 102 of the compressor system. The first region 152 also extends along a first portion of each of the first side surface 162 and the second side surface 160. The second region 154 extends along the remainder of each of the first side surface 162 and the second side surface 160. Pins also can be used with other configurations of composite backup packing rings, such as the configurations shown in FIGS. 4-9.

In some examples, the composite structures described here can be used for components other than backup packing rings, such as reciprocating compressor pressure packing rings, reciprocating compressor intermediate packing rings, reciprocating compressor piston rings or rider rings, reciprocating compressor oil wiper rings, or other reciprocating compressor seal parts.

In one implementation, a ring is an oil wiper ring that wipes oil from the circumference of a reciprocating rod. The rod can be, in one example, a piston rod of reciprocating compressor. In some implementations, an oil wiper system includes two or more rings. The ring can include a first region including a polymer and a second region including a metal. In some examples, a composite oil wiper ring includes one or more side surfaces including a polymer and one or more inner surfaces including a polymer, such as described above relative to FIGS. 4-10.

In some implementations, a seal ring includes a first region including a polymer, a second region including a metal, an inner surface that couples with the outer surface of the reciprocating component, and opposing side surfaces adjoining the inner surface. The first region including the polymer forms the inner surface and at least a portion of at least one of the side surfaces. The term 'seal' does not imply that there is zero clearance at the shaft surface, or that there is no leakage across the seal. Some leakage may be expected past high pressure differential seals.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results.

Accordingly, the previously described example implementations do not define or constrain the present disclosure. Other changes, substitutions, and alterations are also possible without departing from the spirit and scope of the present disclosure.

A number of embodiments of these systems and methods have been described. Nevertheless, it will be understood that various modifications can be made without departing from the spirit and scope of this disclosure. Accordingly, other embodiments are within the scope of the following claims.

What is claimed is:

1. A packing case assembly comprising:
   a packing cup configured to be disposed along a piston rod of a reciprocating gas compressor system; and
   a packing ring set disposed in the packing cup, the packing ring set comprising multiple rings, wherein the packing ring set is configured to be disposed circumferentially around a portion of a length of the piston rod,
   wherein a composite backup packing ring of the packing ring set comprises:
     a first region comprising a polymer, and
     a second region comprising a metal,
     wherein an inner surface of the composite backup packing ring is configured to face the piston rod;
     the first region extends along at least a portion of the inner surface; and
     the second region is disposed circumferentially around at least a portion of the first region.

2. The packing case assembly of claim 1, wherein the first region comprising the polymer extends along a first side surface of the composite backup packing ring, wherein the first side surface is perpendicular to an inner surface of the composite backup packing ring and is configured to face toward a high-pressure end of the piston rod.

3. The packing case assembly of claim 2, wherein the first region comprising the polymer extends along the entire first side surface of the composite backup packing ring.

4. The packing case assembly of claim 2, wherein the first region comprising the polymer extends along a second side surface of the composite backup packing ring, wherein the second side surface is perpendicular to the inner surface of the composite backup packing ring and is configured to face toward a low-pressure end of the piston rod.

5. The packing case assembly of claim 4, wherein the first region comprising the polymer extends along the entire second side surface of the composite backup packing ring.

6. The packing case assembly of claim 1, wherein the first region comprising the polymer contacts the second region comprising the metal.

7. The packing case assembly of claim 1, wherein the composite backup packing ring comprises an interlayer region disposed between the first region comprising the polymer and the second region comprising the metal.

8. The packing case assembly of claim 1, wherein the composite backup packing ring comprises a pin configured to inhibit rotation of the first region relative to the second region.

9. The packing case assembly of claim 1, wherein a thermal conductivity of the metal of the second region is higher than a thermal conductivity of the polymer of the first region.

10. The packing case assembly of claim 1, wherein a strength of the metal of the second region is higher than a strength of the polymer of the first region.

11. The packing case assembly of claim 1, wherein a coefficient of friction between the piston rod and the polymer of the first region is less than a coefficient of friction between the piston rod and the metal of the second region.

12. The packing case assembly of claim 1, wherein a wear resistance of the polymer of the first region is greater than a wear resistance of the metal of the second region.

13. The packing case assembly of claim 1, wherein the metal comprises one or more of cast iron, bronze, aluminum, an aluminum alloy, or steel.

14. The packing case assembly of claim 1, wherein the polymer comprises one or more of polyether ether ketone, polytetrafluoroethylene, nylon, or an aromatic thermosetting copolyester.

15. The packing case assembly of claim 1, wherein the first region comprises multiple layers.

16. The packing case assembly of claim 1, wherein the first region comprises a metallic filler.

17. The packing case assembly of claim 1, wherein the first region comprises a non-metallic filler.

18. A reciprocating gas compressor system comprising:
   a piston rod movable from a first end to a second end of the compressor system, and wherein a gas compressor system is defined at the second end of the compressor system; and
   a packing case assembly comprising:
     a packing cup disposed along the piston rod; and
     a packing ring set disposed in the packing cup, the packing ring set comprising multiple rings, wherein the packing ring set is disposed circumferentially around a portion of a length of the piston rod,
     wherein a composite backup packing ring of the packing ring set comprises:
       a first region comprising a polymer; and
       a second region comprising a metal,
       wherein an inner surface of the composite backup packing ring is configured to face the piston rod;
       the first region extends along at least a portion of the inner surface; and
       the second region is disposed circumferentially around at least a portion of the first region.

19. A reciprocating machine, comprising:
   a reciprocating component comprising an outer surface;

two or more rings configured to receive a portion of the reciprocating component, wherein at least one of the two or more rings comprises:
  a first region comprising a polymer;
  a second region comprising a metal;
  an inner surface configured to couple with the outer surface of the reciprocating component; and
  opposing side surfaces adjoining the inner surface,
  wherein the first region comprising the polymer forms the inner surface and at least a portion of at least one of the side surfaces, and
  the second region is disposed circumferentially around at least a portion of the first region.

20. The reciprocating machine of claim 19, wherein the first region comprising the polymer forms the inner surface and at least a portion of each of the opposing side surfaces.

21. The reciprocating machine of claim 19, wherein the at least one of the two or more rings comprises a pressure breaker, wherein the pressure breaker is the ring of the two or more rings that is nearest a compression cylinder of the reciprocating machine.

* * * * *